US012747397B2

(12) United States Patent
Xu et al.

(10) Patent No.: US 12,747,397 B2
(45) Date of Patent: Sep. 29, 2026

(54) UPGRADING BIO-WASTE IN FCC

(71) Applicant: EXXONMOBIL TECHNOLOGY AND ENGINEERING COMPANY, Spring, TX (US)

(72) Inventors: Xiaochun Xu, Basking Ridge, NJ (US); Dario Campani, Novara (IT); Hyung Rae Kim, Basking Ridge, NJ (US)

(73) Assignee: EXXONMOBIL TECHNOLOGY AND ENGINEERING COMPANY, Spring, TX (US)

(*) Notice: Subject to any disclaimer, the term of this patent is extended or adjusted under 35 U.S.C. 154(b) by 203 days.

(21) Appl. No.: 18/768,222

(22) Filed: Jul. 10, 2024

(65) Prior Publication Data

US 2024/0360367 A1 Oct. 31, 2024

Related U.S. Application Data

(62) Division of application No. 17/837,651, filed on Jun. 10, 2022, now Pat. No. 12,091,617.

(Continued)

(51) Int. Cl.

*C10G 3/00* (2006.01)
*B01D 3/14* (2006.01)

(Continued)

(52) U.S. Cl.

CPC ................ *C10G 3/42* (2013.01); *B01D 3/14* (2013.01); *B01J 8/1818* (2013.01); *B01J 8/24* (2013.01);

(Continued)

(58) Field of Classification Search

CPC ............. C10G 3/42; C10G 2300/1003; C10G 2300/1014; C10G 2300/202;

(Continued)

(56) References Cited

U.S. PATENT DOCUMENTS

| | | | |
|---|---|---|---|
| 10,479,943 | B1 | 11/2019 | Liu et al. |
| 2008/0035528 | A1 | 2/2008 | Marker |

(Continued)

FOREIGN PATENT DOCUMENTS

| | | | |
|---|---|---|---|
| EP | 3825389 | A1 | 5/2021 |
| WO | 2007/090884 | A2 | 8/2007 |
| WO | 2019/129928 | A1 | 7/2019 |

OTHER PUBLICATIONS

Sharifah Mohammad et al; "Palm Oil Mill Effluent Treatment Processes—A Review" pp. 1-22; 2021.

(Continued)

*Primary Examiner* — Prem C Singh
*Assistant Examiner* — Francis C Campanell
(74) *Attorney, Agent, or Firm* — Shook Hardy & Bacon L.L.P.

(57) ABSTRACT

A method may include: providing bio waste stream wherein the bio waste stream comprises at least one bio waste selected from the group consisting of palm oil mill effluent, soapstock, and combinations thereof; introducing the bio waste effluent stream into a fluidized catalytic cracking unit; contacting the bio waste with a catalyst in the fluidized catalytic cracking unit; and cracking at least a portion of the bio waste stream to form cracked products that comprise a cracked product stream.

12 Claims, 2 Drawing Sheets

Related U.S. Application Data

(60) Provisional application No. 63/202,636, filed on Jun. 18, 2021.

(51) Int. Cl.

| | |
|---|---|
| ***B01J 8/18*** | (2006.01) |
| ***B01J 8/24*** | (2006.01) |
| ***B01J 19/24*** | (2006.01) |
| ***C10L 1/04*** | (2006.01) |
| ***C11C 3/00*** | (2006.01) |

(52) U.S. Cl.

CPC ............... *B01J 19/245* (2013.01); *C10L 1/04* (2013.01); *C11C 3/003* (2013.01); *B01J 2219/0004* (2013.01); *C10G 2300/1003* (2013.01); *C10G 2300/1014* (2013.01); *C10G 2300/202* (2013.01); *C10G 2400/02* (2013.01); *C10L 2200/0484* (2013.01)

(58) Field of Classification Search

CPC ...... C10G 2400/02; C10G 3/57; C10G 11/18; C10G 2300/1007; C10G 2300/1011; B01D 3/14; B01J 8/1818; B01J 8/24; B01J 19/245; B01J 2219/0004; C10L 1/04; C10L 2200/0484; C11C 3/003; C11C 3/00; C11C 3/02; Y02P 30/20; C11B 13/00; C11B 13/02

USPC .......................................................... 585/240

See application file for complete search history.

(56) References Cited

U.S. PATENT DOCUMENTS

| | | | | |
|---|---|---|---|---|
| 2010/0163455 | A1* | 7/2010 | Hadjigeorge ........ | C10G 51/026 422/600 |
| 2012/0220509 | A1 | 8/2012 | Mujunen et al. | |
| 2019/0203154 | A1 | 7/2019 | Malm | |
| 2019/0241835 | A1* | 8/2019 | McNeff ................... | C11C 1/002 |

OTHER PUBLICATIONS

Office action received for Canadian Patent Application No. 3222991, mailed on Dec. 6, 2024, 4 pages.

Notice of Allowance received for Canadian Patent Application No. 3,222,991, mailed on Jan. 13, 2026, 1 page.

* cited by examiner

UPGRADING BIO-WASTE IN FCC

CROSS-REFERENCE TO RELATED APPLICATION

This application is a divisional of U.S. patent application Ser. No. 17/837,651, filed Jun. 10, 2022, which claims the priority benefit of U.S. Ser. No. 63/202,636, filed Jun. 18, 2021, both of which applications are incorporated herein by reference.

FIELD OF THE INVENTION

This application relates to processes and systems for producing renewable biofuels from bio-waste sources, including palm oil mill effluent and soapstock.

BACKGROUND OF THE INVENTION

Long-term sustainability is a concern for biofuels production as global demand for biofuels increases. Feedstocks for biofuels production may be sourced from on-purpose production of so called "energy crops" which may contain raw materials which may be converted to biofuels through chemical processing. The on-purpose production of energy crops directly competes with the food industry for arable land and water resources fueling sustainability concerns.

Agricultural products such as animal fats and vegetable oils may have waste streams associated with the production of the agricultural products which present additional cost to the production of the agricultural products. Such waste streams may contain valuable renewable carbon resources, but also pose environmental issues in disposal. Similarly, growing fuels in principle should reduce emissions, there may be several waste streams generated either from the refining of the raw materials or in the production of the biofuels through chemical processing that must be properly disposed of. Some waste streams may contain toxic or harmful chemicals which were utilized in refining raw materials and production of biofuels which must be eliminated or sequestered before disposal. Waste streams may also contain more benign chemicals such as fatty acids which may not be immediately toxic or harmful, but in the context of disposal of the waste stream create serious environmental concerns. Wastewater which contains carbon may be particularly amendable to microbial digestion which if discharged into rivers and streams can rapidly deplete oxygen in the water. Discharge of such wastewater streams may lead to irreversible ecological damage including killing of aquatic life and other deleterious downstream effects. In addition to environmental concerns, waste streams from biofuels production also represent wasted opportunity cost as carbon in the waste streams does not end up in fuels, thereby lowering the efficiency of biofuels production.

Disposal methods have been developed to mitigate the environmental concerns associated with waste streams from production of agricultural products and biofuels. For example, disposal by anerobic and/or aerobic digestion or by physicochemical treatments may be employed to treat the waste streams. However, these methods represent a waste of renewable carbon resources which do not increase the biofuels production capacity and represent an additional cost consideration when producing biofuels and in the production of agricultural products.

SUMMARY OF THE INVENTION

Disclosed herein is an example system for producing renewable biofuels from bio-waste sources, including palm oil mill effluent and soapstock. A method may include providing bio waste stream wherein the bio waste stream comprises at least one bio waste selected from the group consisting of palm oil mill effluent, soapstock, and combinations thereof; introducing the bio waste effluent stream into a fluidized catalytic cracking unit; contacting the bio waste with a catalyst in the fluidized catalytic cracking unit; and cracking at least a portion of the bio waste stream to form cracked products that comprise a cracked product stream.

A method include: providing bio waste stream comprising a fatty acid; introducing the biowaste stream into an esterification unit; reacting at least a portion of the fatty acid in the biowaste stream with an alcohol to produce an esterified biowaste stream comprising esterified products corresponding to the fatty acid; introducing the esterified biowaste stream into a fluidized catalytic cracking unit; contacting the esterified biowaste stream with a catalyst in the fluidized catalytic cracking unit; and cracking at least a portion of the esterified biowaste stream to form cracked products that comprise a cracked product stream Further disclosed herein is a system which may include a bio-waste stream comprising palm oil mill effluent, soapstock, or combinations thereof; and a fluidized catalytic cracking unit, wherein the bio-waste stream is fluidically coupled to the fluidized catalytic cracking unit and wherein the fluidized catalytic cracking unit is configured to crack at least a portion of the bio-waste stream to form cracked products that comprise a cracked product stream.

BRIEF DESCRIPTION OF THE DRAWINGS

The drawings illustrate certain aspects of the present disclosure and should not be used to limit or define the disclosure.

DETAILED DESCRIPTION

Figure 1:
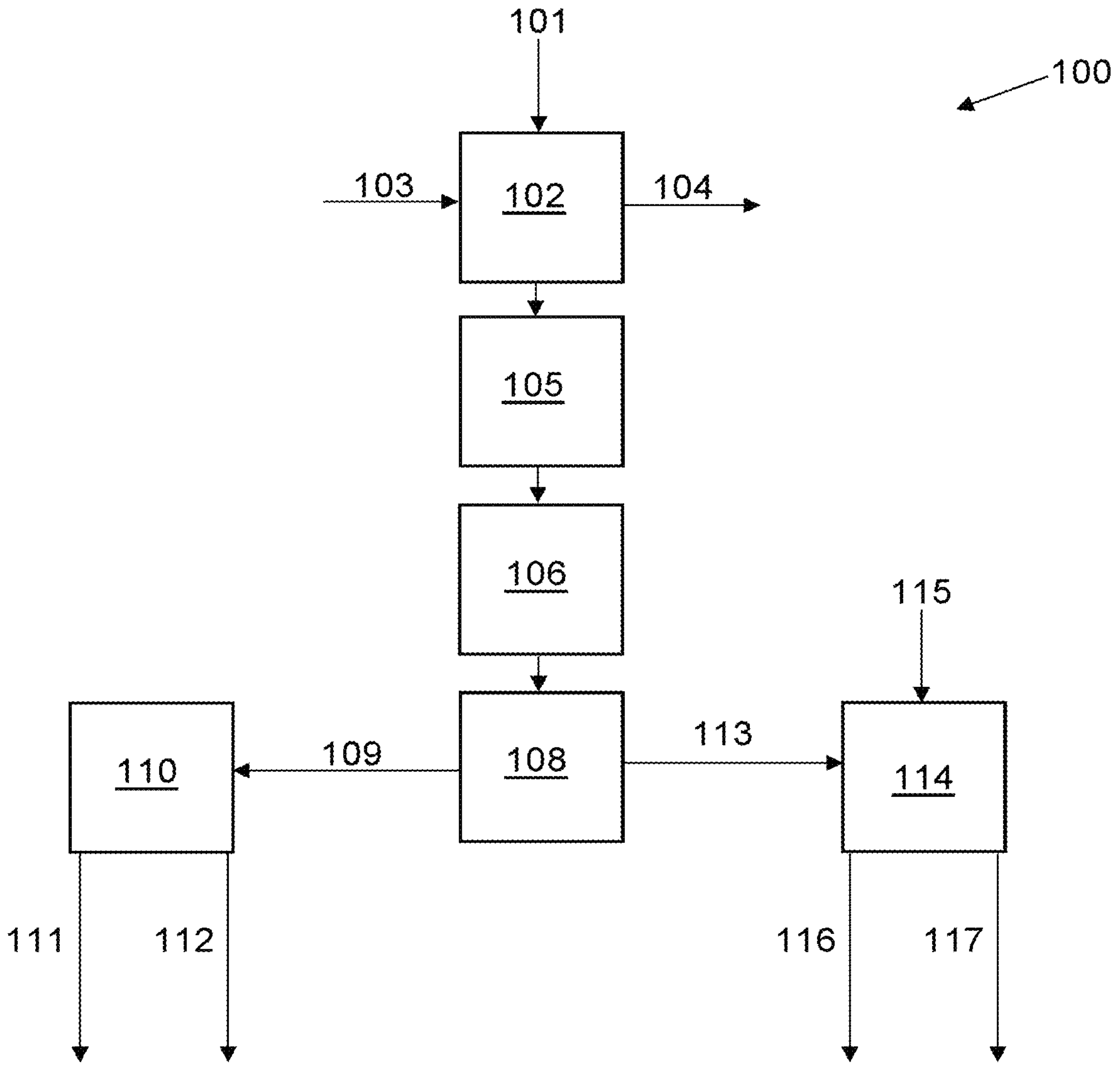
FIG. 1 is a flow diagram of process for producing palm oil.

This application relates to processes and systems for producing renewable biofuels from bio-waste sources, including palm oil mill effluent (POME) and soapstock. As discussed above, there are waste streams associated with the production of agricultural products such as palm oil and vegetable oil which may have a high biological oxygen demand (BOD) due to the presence of carbon containing compounds, nitrogen containing compounds, and minerals which may be particularly amenable to microbial digestion. Conventional methods for disposal of the bio-waste streams represent additional costs to production of the agricultural products and a waste of the carbon resources in the bio-waste streams.

Transportation is difficult to decarbonize due to the need for energy dense fuel sources. Conventional transportation fuels are advantageous as they are readily produced from fractional distillation of crude oil, have high energy density, and are liquid across a broad range of temperatures and pressures. The hydrocarbons in transportation fuel are typically mixtures of paraffins, naphthenes, and aromatics with carbon numbers from about 6 to 20 (C6-C20). Jet fuels, for example, are typically formulated with various ratios of isomers of C9-C16 hydrocarbons to provide the desired freezing point, density, autoignition temperature, and other physical properties. The bio-waste streams associated with palm oil and vegetable oil production contain carbon compounds with carbon chain lengths that are within the carbon ranges that may be ideal to be converted to renewable bio-fuel. As used herein, bio-fuel and derivatives thereof are paraffins, naphthenes, and aromatics with carbon numbers from C3-C20.

Methods disclosed herein may utilize bio-waste streams as a feedstock to a catalytic cracking unit to produce bio-fuel with carbon numbers from C3-C20. The methods disclosed herein may include separating/converting a bio-waste stream into a carbon containing fraction, introducing the carbon containing fraction into a fluidized catalytic cracking unit, and contacting the carbon containing fraction with a catalyst at conditions operable to crack at least a portion of the carbon containing fraction to shorter chain hydrocarbon bio-fuels with carbon numbers from C3-C20.

Bio-waste streams may be from any source that contains hydrocarbons with chain lengths that may be converted to hydrocarbon bio-fuels with carbon numbers from C3-C20 with boiling points from about 30° C. to about 360° C. The present application may be particularly suited for bio-waste streams from palm oil and vegetable oil production processes, which may have relatively low value and may be difficult to dispose of. Another suitable bio-waste source may be tall oil which may be produced as a side product from the processing of soft woods, such as pine trees, to produce turpentine, pulp, paper, and other wood products. Tall oil may be a mixture of saponified fatty acids, resin acids such as abietic and pimaric acids, and an unsaponifiable fraction. Another bio-waste stream suitable for the present process may be non-edible oils with free fatty acid content such as jatropha, neem, karanja, rubber seed, mahua, and silk cotton tree oil, for example. Non-edible oils may also include used cooking oils such as peanut oil, olive oil, canola oil, coconut oil, vegetable shortening oil, lard, corn oil, soybean oil, safflower oil, cottonseed oil, and sunflower oil, for example.

FIG. 1 is a flow diagram of a palm oil process 100. Palm oil process 100 is a simplified version of a palm oil process and may be modified to include more of less unit operations depending on the particular process employed. Palm oil process 100 may begin with providing fresh fruit bunches 101 to sterilization step 102. Sterilization step 102 may take place in any suitable equipment such as drums, tanks, containers, and the like configured to allow for steam sterilization. The equipment should be suitable for containing the fresh fruit bunches during the sterilization. Steam stream 103 may be provided to sterilization step 102 whereby the fresh fruit bunches may be contacted with the steam to sterilize the fresh fruit bunches. During the sterilization step, a fraction of the components, such as fatty acids, of the fresh fruit bunches may be absorbed into the steam. A condensate stream 104 may be withdrawn from sterilization step 102, whereby the condensate stream may contain carbon containing compounds, nitrogen containing compounds, and minerals. Condensate stream 104 may represent one of the sources of POME for palm oil process 100.

From sterilization step 102, the sterilized fresh fruit bundles from sterilization step 102 may be transported to stripping step 105 whereby the sterilized fresh fruit bunches may be separated into sterilized fruit and stalks. Stripping step 105 may include any suitable equipment for separating the sterilized fruit and stalks including threshers, rotating drums, or other equipment configured to separate. From stripping step 105 the sterilized fresh fruit bunches may proceed to digestion step 106 whereby the sterilized fresh fruit bunches may be re-heated to further separate the pericarp from the fruit seeds which may then be introduced into pressing step 108. Digestion step 106 may be carried out in any suitable equipment such as a steam heated drum, for example, or any other equipment suitable for separating pericarp. In pressing step 108, the fruits may be pressed, for example in a screw press or hydraulic press, to liberate palm oil and water from the seeds leaving behind press cake.

The palm oil and water may be withdrawn as stream 109 which may then be introduced into purification step 110. In purification step 110, the palm oil may be separated from the water and solids and purified to produce palm oil product stream 111 containing a majority of the oils from stream 109 and wastewater stream 112 which may contain water, carbon containing compounds, nitrogen containing compounds, and minerals. Purification step 110 may include any number of unit operations with associated equipment such as settling vessels, filtration vessels, decanting vessels, or any other equipment required to separate and purify the palm out. Wastewater stream 112 may represent one of the sources of POME for palm oil process 100. From pressing step 108, the press cake may be introduced into solids processing step 114 via stream 113. In solids processing step 114, the press cake may be further processed to remove fibers, kernels, shells, and other solids for use as fuel for example, and may be withdrawn as processed solids stream 116. Solids processing step 114 may include drying vessels and solids separation equipment, for example. Water stream 115 may be introduced into solids processing step 114 as a solvent for wet separation steps, if desired, and may be withdrawn as wastewater stream 117 which may contain water, carbon containing compounds, nitrogen containing compounds, and minerals. Wastewater stream 117 may represent one of the sources of POME for palm oil process 100. Solids processing step 114 may include any suitable equipment such as tanks, drums, and the like which are configured to allow for water stream 115 to contact solids in stream 113.

The process described in FIG. 1 is only one of many methods to produce palm oil and any particular facility that produces palm oil may include more or less process steps to produce the palm oil. Further there may be additional steps where POME may be generated in the production of palm oil not specifically enumerated in FIG. 1. The condensate stream 104, wastewater stream 112, and water stream 115 may be combined to form a singular POME stream which may be discharged outside battery limits of palm oil process 100.

Palm oil fatty acid typically contains about 50% saturated fatty acids, 40% monounsaturated fatty acids, and about 10% polyunsaturated fatty acids but the exact composition may vary depending on the species of palm the fresh fruit bunches used in the extraction process are sourced from and the process used to extract the palm oil. Palm oil may contain several fatty acids including capric acid, lauric acid, myristic acid, pentadedecyclic acid, palmitic acid, palmitoleic acid, heptadecanoic acid, cia-10-heptadecanoic acid, stearic acid, elaidic acid, oleic acid, linoleic acid, alpha-linolenic acid, linolenic acid, arachidic acid, eicosenoic acid, heneicosanoic acid, and behenic acid, for example. The composition of POME may vary depending on the particular unit operations and process condition utilized to produce palm oil. POME may be generally composed of about 90% to about 95% water, about 1% to about 5% palm oil fatty acid, and about 0.1 to about 2% suspended plant solids.

Figure 2:
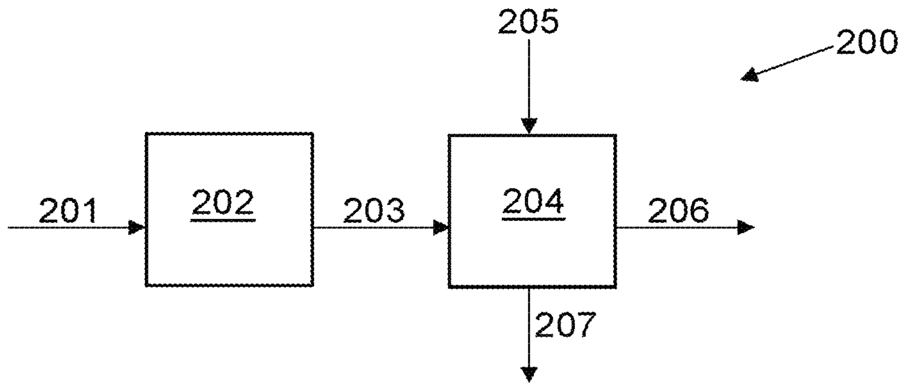
FIG. 2 is a flow diagram of a process for producing vegetable oil.

FIG. 2 illustrates a flow diagram of a process 200 for producing vegetable oil. Process 220 may begin with providing feedstock 201 to extraction step 202. Feedstock 201 may include oil-containing plant tissues such as seeds, pump, tubers, and sprouts, for example which may be extracted to produce vegetable oil. In extraction step 202, the oils present in feedstock 201 may be extracted by any suitable means such as by chemical extraction using solvents or enzymes, supercritical carbon dioxide extraction, fractional distillation, or mechanical pressing or shearing, for example. The extraction step 202 may be carried out in any equipment suitable for the unit operation such as a suitable pressure vessel for supercritical carbon dioxide extraction. From extraction step 202, crude vegetable oil stream 203 may be introduced into purification step 204. In purification step 204, the crude vegetable oil from crude vegetable oil stream 203 may be subjected to various unit operations to improve the quality of the crude vegetable oil to produce refined vegetable oil stream 206. Some unit operations may include degumming, bleaching, deodorizing, hydrogenating, water washing, acid treatment, and alkali treatment, for example. The purification step 204 may be carried out in any suitable equipment such as in a hydrogenation reactor for a hydrogenation step, or vessels, drums, and/or containers for bleaching, for example. In FIG. 2, aqueous stream 205 may be introduced into purification step 204 and contacted with the crude vegetable oil stream. Aqueous stream 205 may include water, aqueous acids, and/or aqueous bases, used in the purification step 204. Soapstock stream 207 may be withdrawn from purification step 204.

Vegetable oil fatty acid typically contains a mixture of saturated fatty acids, monounsaturated fatty acids, and polyunsaturated fatty acids in various ratios depending on the source feedstock used to produce the vegetable oil and extraction methods utilized. For example, vegetable oil may contain any of lauric acid, myristic acid, palmitic acid, stearic acid, oleic acid, linoleic acid, linolenic acid, and arachidic acid for example. The composition of soapstock may vary depending on the particular unit operations and process condition utilized to produce vegetable oil. Soapstock may be generally composed of about water, vegetable oil fatty acid, and phospholipids for example.

Figure 3:
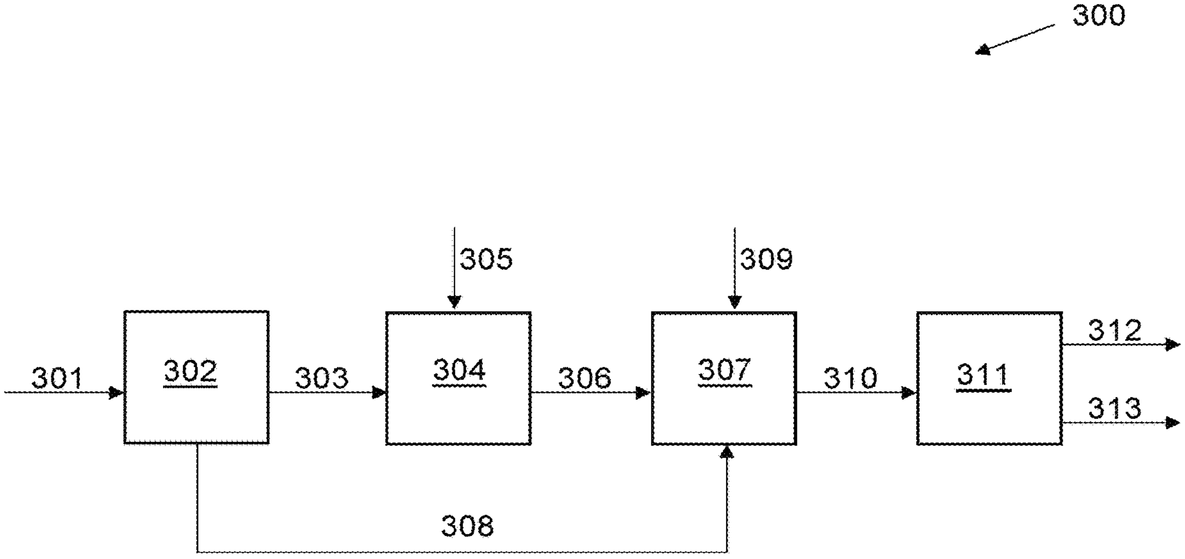
FIG. 3 is a flow diagram of a process for producing a renewable bio-fuels from palm oil mill effluent or soapstock.

FIG. 3 illustrates flow diagram of a process 300 for producing a renewable bio-fuels with carbon numbers from C3-C20 from a bio-waste stream. Process 300 may begin with introducing bio-waste stream 301 into pre-processing step 302. Bio-waste stream 301 may include any of the bio-waste streams disclosed herein including POME and soapstock. Bio-waste stream 301 may include fractions which are not suitable for conversion to renewable bio-fuels such as an aqueous portion, or solids portion, for example. In pre-processing step 302, the portions of bio-waste stream 301 which are unsuitable for producing bio-fuels may be separated from fatty acids in bio-waste stream 301. In pre-processing step 302, water in bio-waste stream 301 may be removed by evaporation, distillation, centrifuging, and/or decanting, for example to concentrate fatty acids in bio-waste stream 301. Pre-processing step 302 may include any suitable equipment for performing the unit operation to separate the fatty acid from bio-waste stream 301. For example, a distillation column may be used to separate the aqueous portion of the bio-waste stream 301. In some examples, bio-waste stream 301 may include aqueous emulsions (oil in water) of water and fatty acids. Pre-processing step 302 may include a coalescing step whereby oil droplets dispersed in bio-waste stream 301 may be brought in contact within a coalesce to form larger droplets and produce a concentrated fatty acid phase which may be separated from a bulk aqueous phase. Other techniques may include adding a demulsifier to the bio-waste stream 301 which may cause oil dispersed within the aqueous phase to coalesce which may then be separated from a bulk aqueous phase. Other unit operations in pre-processing step 302 may include steps to reduce solids content of bio-waste stream 301 such as sedimentation, filtration, and/or cyclonic separation, for example. Purified fatty acid stream 303 may be withdrawn from pre-processing step 302.

Purified fatty acid stream 303 may contain a majority of the fatty acids from bio-waste stream 301 and may be essentially free of water and solids that were present in bio-waste stream 301. For example, purified fatty acid stream 303 may contain about 95 wt. % or greater fatty acid. Alternatively, purified fatty acid stream 303 may contain about 95 wt. % fatty acid, about 96 wt. % fatty acid, about 97 wt. % fatty acid, about 98 wt. % fatty acid, about 99 wt. % fatty acid, about 99.9 wt. % fatty acid or greater, or any ranges there between.

From pre-processing step 302 purified fatty acid stream 303 may be conveyed to esterification step 304. Esterification step 304 may include an esterification reactor configured to receive purified fatty acid stream 303 and alcohol stream 305. Alcohol stream 305 may include any suitable monoalcohol, diol, triol, or polyol with carbon numbers from C1-C5, for example. The esterification reactor may be any suitable reactor such as a CSTR, for example, which is configured to contact the purified fatty acid stream 303 and alcohol stream 305 to react the fatty acid and the glycerol. The esterification reaction may be catalyzed by any suitable means such as by mineral acids, such as sulfuric acids or other suitable mineral acids, or by catalysts with acidic activity such as zeolites for example. Other suitable catalysts may include p-toluenesulfonic acid and graphene oxide. The esterification reactor may be operated at conditions suitable to convert at least a portion of the fatty acid and the glycerol to a corresponding glyceride. For example, the glyceride may include monoglycerides, diglycerides, triglycerides, or higher order glycerides which may correspond to the monoalcohol, diol, triol, or polyol introduced in alcohol stream 305. The esterification may be carried out at any suitable temperature, including from about 180° C. to about 240° C., for mineral acid catalyzed reaction, or from about 50° C. to about 150° C. for catalysts with acidic activity. The molar ratio of for example, glycerol to fatty acid may be from about 1:1 glycerol to fatty acid to about 1:10 glycerol to fatty acid, depending on the desired product being mono, di, or triglyceride or any ratio of products therein.

Esterified stream 306 containing the esterified product from esterification step 304 as well as any unreacted free fatty acid, may be withdrawn from esterification step 304 and be introduced into fluidized catalytic cracking step 307. In some examples, the esterification step may be skipped and purified fatty acid stream 308 from pre-processing step 302 may be conveyed to fluidized catalytic cracking step 307. Fluidized catalytic cracking step 307 may include equipment such as fluidized bed reactors, regenerators, cyclones, turbines, precipitators, and distillation columns and other equipment configured to catalytically crack a feed containing longer chain hydrocarbons to produce a product stream containing relatively shorter chain hydrocarbons including hydrocarbons with carbon numbers from C3-C20 with boiling points from about 30° C. to about 360° C. A co-feed stream 309 may also be provided to fluidized catalytic cracking step 307. Co-feed stream 309 may include any suitable hydrocarbon feed for a fluidized catalytic cracker, including methane, ethylene, ethane, propylene, propane, C4 olefin/saturate, gasoline (C5-C10) with boiling ranges of 20° C.-200° C., naphtha (C5-C9) with boiling ranges from 20° C.-180° C., diesel (C10-C20) with boiling ranges of 180° C.-340° C., clarified oil from FCC, heavy atmospheric gas oil (HAGO) and/or vacuum gas oil (VGO) with initial boiling point of 340° C. or greater. Co-feed stream 309 may be mixed with esterified stream 306 and/or purified fatty acid stream 308 prior to introduction into fluidized catalytic cracking step 307. Co-feed stream 309 may be mixed with esterified stream 306 and/or purified fatty acid stream 308 in any ratio such as from about 1 mol % to about 99 mol %, about 5 mol % to about 30 mol %, about 30 mol % to about 70 mol %, about 70 mol % to about 99 mol %, or any ranges therebetween.

Fluidized catalytic cracking step 307 may be operated at any suitable conditions to catalytically crack at least a portion of the feed including co-feed stream 309, esterified stream 306, and/or purified fatty acid stream 308 to form a cracked product stream 310. For example, fluidized catalytic cracking step 307 may be operated at a temperature of about 400° C. to about 600° C. and at a pressure of about 1 bar to about 3 bar. The catalyst may be supplied in any suitable ratio with the feed to fluidized catalytic cracking step 307, for example in a ratio of about 4:1 to about 8:1 catalyst to feed. Cracked product stream 310 may be introduced into separation unit 311. Separation unit 311 may include any separation equipment, such as distillation columns, configured to separate components of the cracked product stream into a bottoms stream 313 which may contain a majority of bottoms products such as those with boiling points greater than 343° C. Separation unit 311 may further separate a top products stream 312 which may contain components such as dry gas (C1+C2), LPG (C3+C4), C5+ liquid, naphtha C5 liquids through components with boiling ranges up to about 221° C., and light cycle oil with components with boiling ranges from about 221-343° C. While illustrated as a single stream, top products stream 312 may contain any number of individual streams with product cuts at any boiling ranges desired for a particular application. For example, a top product stream 312 may include a hydrocarbon bio-fuel with carbon numbers from C4-C20 with boiling points from about 30° C. to about 360° C.

Accordingly, the preceding description describes methods and systems for producing renewable biofuels from bio-waste sources, including palm oil mill effluent and vegetable oil effluent. The processes and systems disclosed herein may include any of the various features disclosed herein, including one or more of the following embodiments.

Embodiment 1. A method comprising: providing bio waste stream wherein the bio waste stream comprises at least one bio waste selected from the group consisting of palm oil mill effluent, soapstock, and combinations thereof; introducing the bio waste effluent stream into a fluidized catalytic cracking unit; contacting the bio waste with a catalyst in the fluidized catalytic cracking unit; and cracking at least a portion of the bio waste stream to form cracked products that comprise a cracked product stream.

Embodiment 2. The method of embodiment 1, wherein the bio waste stream comprises the palm oil mill effluent, wherein the palm oil mill effluent is derived from a palm oil process, wherein the palm oil mill effluent comprises water, fatty acid, and solids, and wherein the method further comprises: separating at least a portion of the water and the solids to produce a purified palm oil mill effluent, wherein the purified palm oil mill effluent is introduced into the fluidized catalytic cracking unit.

Embodiment 3. The method of any of embodiments 1-2, wherein the palm oil mill effluent stream comprises at least one fatty acid selected from the group consisting of capric acid, lauric acid, myristic acid, pentadedecyclic acid, palmitic acid, palmitoleic acid, heptadecanoic acid, cia-10-heptadecanoic acid, stearic acid, elaidic acid, oleic acid, linoleic acid, alpha-linolenic acid, linolenic acid, arachidic acid, eicosenoic acid, heneicosanoic acid, behenic acid, and combinations thereof.

Embodiment 4. The method of any of embodiments 1-3, wherein the step of separating comprises evaporation, distillation, centrifuging, decanting, and combinations thereof.

Embodiment 5. The method of any of embodiments 1-4, wherein the purified palm oil mill effluent stream is at least 95 wt. % fatty acid.

Embodiment 6. The method of any of embodiments 1-5, wherein the bio waste effluent stream comprises the palm oil mill effluent stream comprising fatty acid, and wherein the method further comprises: introducing the palm oil mill effluent stream into an esterification unit; and reacting at least a portion of the fatty acid in the palm oil mill effluent stream with an alcohol to produce an esterified palm oil mill effluent stream, wherein the bio waste effluent stream introduced into the fluidized catalytic cracking unit comprises the esterified palm oil mill effluent stream.

Embodiment 7. The method of any of embodiments 1-6, wherein the alcohol comprises at least one alcohol selected from the group consisting of a monoalcohol, a diol, a triol, and combinations thereof with carbon numbers ranging from C1-C5.

Embodiment 8. The method of any of embodiments 1-7, further comprising cracking at a portion of the bio waste steam in the presence of a hydrocarbon co-feed.

Embodiment 9. The method of any of embodiments 1-8, wherein the bio waste steam comprises the soapstock, wherein the soapstock is derived from a soapstock process, wherein the soapstock comprises fatty acid, and wherein the method further comprises: introducing the soapstock stream into an esterification unit; and reacting at least a portion of the fatty acid in the soapstock stream with an alcohol to produce an esterified soapstock stream, wherein the bio waste effluent stream introduced into the fluidized catalytic cracking unit comprises the esterified soapstock stream.

Embodiment 10. The method of any of embodiments 1-9, further comprising cracking at a portion of the bio waste steam in the presence of a hydrocarbon co-feed Embodiment 11. The method of any of embodiments 1-10, wherein the alcohol comprises a monoalcohol, a diol, a triol, and combinations thereof with carbon numbers ranging from C1-C5.

Embodiment 12. The method of any of embodiments 1-11, further comprising cracking at a portion of the bio waste steam in the presence of a hydrocarbon co-feed.

Embodiment 13. The method of any of embodiments 1-12, further comprising cracking the bio waste stream in the presence of a hydrocarbon co-feed comprising vacuum gas oil having an initial boiling point of 340° C. or greater.

Embodiment 14. The method of any of embodiments 1-13, further comprising separating at least a portion of the cracked product stream in a distillation unit to produce a hydrocarbon bio-fuel with carbon numbers ranging from C3-C20.

Embodiment 15. The method of any of embodiments 1-14, wherein the bio waste stream further comprises at least one additional oil selected from the group consisting of tall oil, non-edible oils, and combinations thereof, wherein the non-edible oils comprise at least one oil selected from the group consisting of jatropha, neem, karanja, rubber seed, mahua, and silk cotton tree oil, and combinations thereof.

Embodiment 16. A method comprising: providing bio waste stream comprising a fatty acid; introducing the biowaste stream into an esterification unit; reacting at least a portion of the fatty acid in the biowaste stream with an alcohol to produce an esterified biowaste stream comprising esterified products corresponding to the fatty acid; introducing the esterified biowaste stream into a fluidized catalytic cracking unit; contacting the esterified biowaste stream with a catalyst in the fluidized catalytic cracking unit; and cracking at least a portion of the esterified biowaste stream to form cracked products that comprise a cracked product stream.

Embodiment 17. A system comprising: a bio-waste stream comprising palm oil mill effluent, soapstock, or combinations thereof; and a fluidized catalytic cracking unit, wherein the bio-waste stream is fluidically coupled to the fluidized catalytic cracking unit and wherein the fluidized catalytic cracking unit is configured to crack at least a portion of the bio-waste stream to form cracked products that comprise a cracked product stream.

Embodiment 18. The system of embodiment 17, further comprising a purification unit, wherein the bio-waste stream further comprises water, wherein the bio-waste stream is fluidically coupled to the purification unit, wherein purification unit is configured to remove at least a portion of the water from the bio-waste stream to produce a purified bio-waste stream, and wherein the purified bio-waste stream is fluidically coupled to the fluidized catalytic cracking unit.

Embodiment 19. The system of any of embodiments 17-18, further comprising an esterification unit, wherein the bio-waste stream is fluidically coupled to the esterification unit, wherein the bio-waste stream comprises a fatty acid, wherein the esterification unit is configured to esterify at least a portion of the fatty acid in the bio-waste stream with an alcohol to produce an esterified stream, and wherein the esterified stream is fluidically coupled to the fluidized catalytic cracking unit.

Embodiment 20. The system of any of embodiments 17-19, further comprising a hydrocarbon co-feed stream, wherein the hydrocarbon co-feed stream is fluidically coupled to the fluidized catalytic cracking unit.

EXAMPLES

To facilitate a better understanding of the present disclosure, the following examples of certain aspects of some embodiments are given. In no way should the following examples be read to limit, or define, the entire scope of the disclosure.

Example 1

Palm oil mill effluent was provided from a palm oil mill. Solids were separated from the palm oil mill effluent and thereafter the palm oil mill effluent was separated into an oil fraction and aqueous fraction. The oil fraction was esterified with glycerol to form an esterified product. Laboratory tests to determine properties of the esterified product were performed, the results of which are shown in Table 1. The esterified product fatty acid profile is shown in Table 2.

TABLE 1

| Properties | |
|---|---|
| H, wt % | 11.7 |
| O, wt % | 13.2 |
| Carbon, wt % | 75.0 |
| Water, ppm | 1200 |
| Density at 40° C., g/cc | 0.913 |
| Total Acid Number (TAN), mg KOH/g | 3.7 |
| Free Fatty Acids, wt % | 2.01 |
| Pour Point, ° C. | 29 |
| Metals, ppm | 25 |
| SimDis, ° C. | |
| 0.5% | 339 |
| 5% | 409 |
| 10% | 452 |
| 20% | 514 |
| 30% | 525 |
| 40% | 536 |
| 50% | 573 |
| 60% | 590 |
| 70% | 593 |
| 80% | 600 |
| 90% | 606 |
| 95% | 612 |
| 99% | 646 |
| 99.5% | 654 |

TABLE 2

| Fatty Acid Profile | Wt. % |
|---|---|
| Capric (C10:0) | 0.03 |
| Lauric (C12:0) | 0.29 |
| Myristic (C14:0) | 1.13 |
| Pentadadecyclic (C15:0) | 0.06 |
| Palmitic (C16:0) | 47.12 |
| Palmitoleic (C16:1) | 0.13 |
| Heptadecanoic (C17:0) | 0.12 |
| cis-10-Heptadecanoic (C17:1) | 0.62 |
| Stearic (C18:0) | 4.97 |
| Elaidic (C18:1N9T) | 1.61 |
| Oleic (C18:1N9C) | 37.01 |
| Linoleic (C18:2N9C) | 6.42 |
| alpha-Linolenic (C18:3N3) | 0.14 |
| Arachidic (C20:0) | 0.43 |
| Eicosenoic (C20:1) | 0.12 |
| Heneicosanoic (C21:0) | 0.19 |
| Behenic (C22:0) | 0.07 |

Example 2

The esterified product from Example 1 was co-processed with vacuum gas oil in an FCC pilot plant unit. The tests were carried out with vacuum gas oil (VGO) only, 5% esterified product with 95% vacuum gas oil, and 20% esterified product with 80% vacuum gas oil. The tests were carried out at 540° C. with a catalyst to feed ratio of 6.26 with a commercial FCC catalyst. The results of the test are shown in Table 3. It was observed that with esterified product the conversion from pure VGO did not significantly change. Further, since the esterified product contains about 13% oxygen, the yields of CO, CO2, and H2O increased and the yield of liquid hydrocarbons also decreased. Coke yield was unexpectedly decreased.

TABLE 3

| | VGO only | 5% Esterified Product | 20% Esterified Product |
|---|---|---|---|
| 221° C. Conversion (%) | 77.5 | 76.7 | 78.0 |
| CO | 0.0 | 0.1 | 0.5 |
| $CO_2$ | 0.2 | 0.2 | 0.4 |
| $H_2O$ | 0.0 | 0.5 | 2.2 |
| Hydrogen ($H_2$) | 0.5 | 0.4 | 0.3 |
| Dry Gas ($C_1$ + $C_2$) | 3.0 | 3.0 | 2.9 |
| LPG ($C_3$ + $C_4$) | 17.0 | 17.3 | 17.5 |
| $C_5$+ Liquid | 71.6 | 70.9 | 68.9 |
| Naphtha ($C_5$ 221° C.) | 49.1 | 47.6 | 46.9 |
| LCO (221-343° C.) | 14.4 | 14.3 | 13.9 |
| Bottom (343+ ° C.) | 8.1 | 8.9 | 8.1 |
| Coke | 8.1 | 7.9 | 7.6 |

While the disclosure has been described with respect to a number of embodiments and examples, those skilled in the art, having benefit of this disclosure, will appreciate that other embodiments can be devised which do not depart from the scope and spirit of the disclosure as disclosed herein. Although individual embodiments are discussed, the present disclosure covers all combinations of all those embodiments.

While compositions, methods, and processes are described herein in terms of "comprising," "containing," "having," or "including" various components or steps, the compositions and methods can also "consist essentially of" or "consist of" the various components and steps. The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the disclosure, additionally, they do not exclude impurities and variances normally associated with the elements and materials used.

All numerical values within the detailed description and the claims herein modified by "about" or "approximately" with respect the indicated value are intended to take into account experimental error and variations that would be expected by a person having ordinary skill in the art.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited.

What is claimed is:

1. A method comprising:

providing a bio-waste stream wherein the biowaste-stream comprises at least one bio waste including soapstock, and wherein the bio-waste stream further comprises water;

passing the bio-waste stream to a purification unit and removing at least a portion of the water from the bio-waste stream in the purification unit to produce a purified bio-waste stream comprising at least 95 wt. % fatty acid;

introducing the purified bio-waste stream into a fluidized catalytic cracking unit;

contacting the purified bio-waste stream with a catalyst in the fluidized catalytic cracking unit; and cracking at least a portion of the bio-waste stream to form cracked products that comprise a cracked product stream.

2. The method of claim 1, wherein the soapstock is derived from a soapstock process, wherein the soapstock comprises fatty acid, and wherein the method further comprises:

introducing the soapstock stream into an esterification unit; and reacting at least a portion of the fatty acid in the soapstock stream with an alcohol to produce an esterified soapstock stream, wherein the purified bio-waste stream introduced into the fluidized catalytic cracking unit comprises the esterified soapstock stream.

3. The method of claim 2, further comprising cracking at a portion of the purified bio-waste stream in the presence of a hydrocarbon co-feed.

4. The method of claim 2, wherein the alcohol comprises a monoalcohol, a diol, a triol, and combinations thereof with carbon numbers ranging from C1-C5.

5. The method of claim 1, further comprising cracking at a portion of the purified bio-waste stream in the presence of a hydrocarbon co-feed.

6. The method of claim 1, further comprising cracking the purified bio-waste stream in the presence of a hydrocarbon co-feed comprising vacuum gas oil having an initial boiling point of 340° C. or greater.

7. The method of claim 1, further comprising separating at least a portion of the cracked product stream in a distillation unit to produce a hydrocarbon bio-fuel with carbon numbers ranging from C3-C20.

8. The method of claim 1, wherein the purified bio-waste stream further comprises at least one additional oil selected from the group consisting of tall oil, non-edible oils, and combinations thereof, wherein the non-edible oils comprise at least one oil selected from the group consisting of jatropha, neem, karanja, rubber seed, mahua, and silk cotton tree oil, and combinations thereof.

9. A method comprising:

providing a bio-waste stream comprising a fatty acid, wherein the bio-waste stream further comprises water;

passing the bio-waste stream to a purification unit and removing at least a portion of the water from the bio-waste stream in the purification unit to produce a purified bio-waste stream comprising at least 95 wt. % fatty acid;

introducing the purified biowaste stream into an esterification unit;

reacting at least a portion of the fatty acid in the purified biowaste stream with an alcohol to produce an esterified biowaste stream comprising esterified products corresponding to the fatty acid;

introducing the esterified biowaste stream into a fluidized catalytic cracking unit;

contacting the esterified biowaste stream with a catalyst in the fluidized catalytic cracking unit; and cracking at least a portion of the esterified biowaste stream to form cracked products that comprise a cracked product stream.

10. A system comprising:

a bio-waste stream comprising soapstock, wherein the bio-waste stream further comprises water;

a purification unit, wherein the bio-waste stream is fluidically coupled to the purification unit, wherein the purification unit is configured to remove at least a portion of the water from the bio-waste stream to produce a purified bio-waste stream; and a fluidized catalytic cracking unit, wherein the purified bio-waste stream is fluidically coupled to the fluidized catalytic cracking unit and wherein the fluidized catalytic cracking unit is configured to crack at least a portion of the purified bio-waste stream to form cracked products that comprise a cracked product stream.

11. The system of claim 10, further comprising an esterification unit, wherein the purified bio-waste stream is fluidically coupled to the esterification unit, wherein the purified bio-waste stream comprises a fatty acid, wherein the esterification unit is configured to esterify at least a portion of the fatty acid in the purified bio-waste stream with an alcohol to produce an esterified stream, and wherein the esterified stream is fluidically coupled to the fluidized catalytic cracking unit.

12. The system of claim 10, further comprising a hydrocarbon co-feed stream, wherein the hydrocarbon co-feed stream is fluidically coupled to the fluidized catalytic cracking unit.

* * * * *